(12) United States Patent
Puterbaugh et al.

(10) Patent No.: US 7,042,124 B2
(45) Date of Patent: May 9, 2006

(54) ELECTRIC MOTORS FOR WASHDOWN, FOOD PROCESSING, AND CHEMICAL APPLICATIONS

(75) Inventors: David K. Puterbaugh, Geneva, IN (US); David F. Kowalczyk, Berne, IN (US); Kent J. Markley, Bluffton, IN (US); Vernon Brooks, Roanoke, IN (US)

(73) Assignee: Franklin Electric Co., Inc., Bluffton, IN (US)

( * ) Notice: Subject to any disclaimer, the term of this patent is extended or adjusted under 35 U.S.C. 154(b) by 184 days.

(21) Appl. No.: 10/678,611

(22) Filed: Oct. 3, 2003

(65) Prior Publication Data

US 2005/0073204 A1 Apr. 7, 2005

(51) Int. Cl.
*H02K 1/04* (2006.01)
*H02K 5/10* (2006.01)
*H02K 5/00* (2006.01)

(52) U.S. Cl. ............................ 310/89; 310/88; 310/43; 310/71

(58) Field of Classification Search ................ 310/89, 310/88, 87
See application file for complete search history.

(56) References Cited

U.S. PATENT DOCUMENTS

| | | | |
|---|---|---|---|
| 2,961,555 A | 11/1960 | Towne | |
| 3,054,005 A | 9/1962 | McMaster et al. | |
| 3,058,156 A | 10/1962 | O'Connor | |
| 3,075,250 A | 1/1963 | Strohm et al. | |
| 3,210,577 A | 10/1965 | Hogue | |
| 3,256,590 A | 6/1966 | Myers | |
| 3,353,041 A | 11/1967 | Little | |
| 3,436,569 A | 4/1969 | Flaherty, Jr. et al. | |
| 3,544,240 A * | 12/1970 | Rundell | 417/416 |
| 3,546,504 A | 12/1970 | Janssen et al. | |
| 3,551,711 A | 12/1970 | Davis | |
| 3,638,055 A * | 1/1972 | Zimmermann | 310/43 |
| 3,887,826 A | 6/1975 | Apostoleris | |
| 4,015,154 A | 3/1977 | Tanaka et al. | |
| 4,048,530 A | 9/1977 | Kaufman, Jr. | |
| 4,067,562 A | 1/1978 | Weber | |
| 4,128,527 A | 12/1978 | Kinjo et al. | |
| 4,287,662 A | 9/1981 | Otto | |
| 4,291,455 A | 9/1981 | Schnyder | |
| 4,352,897 A | 10/1982 | Ogata et al. | |
| 4,381,464 A * | 4/1983 | Schnyder | 310/45 |
| 4,384,226 A | 5/1983 | Sato et al. | |
| 4,387,311 A | 6/1983 | Kobayashi et al | |
| 4,387,313 A | 6/1983 | Yamamoto et al. | |
| 4,412,146 A | 10/1983 | Flitterer et al. | |

(Continued)

FOREIGN PATENT DOCUMENTS

DE 196 35 180 A 3/1998

(Continued)

*Primary Examiner*—Darren Schuberg
*Assistant Examiner*—Erik Preston
(74) *Attorney, Agent, or Firm*—Marshall, Gerstein & Borun LLP

(57) ABSTRACT

An electric motor includes a motor casing, a stator assembly, a rotor shaft assembly, first and second end bells, respectively, attached to each end of the motor casing, and an electrical inlet in the motor casing for supplying power to the motor. The motor further includes a first bearing assembly housed in the first end bell and a second bearing assembly housed in the second end bell. Both bearing assemblies and support the rotor shaft assembly and seal the interior of the motor casing from moisture. The motor also includes a heat-conductive solid resin that encapsulates the stator assembly.

27 Claims, 6 Drawing Sheets

U.S. PATENT DOCUMENTS

| | | |
|---|---|---|
| 4,437,027 A | 3/1984 | Yamamoto et al. |
| 4,456,844 A | 6/1984 | Yamamoto et al. |
| 4,546,130 A | 10/1985 | Nishida et al. |
| 4,549,105 A | 10/1985 | Yamamoto et al. |
| 4,585,966 A | 4/1986 | Nishida et al. |
| 4,651,039 A | 3/1987 | Yamamoto et al. |
| 4,841,190 A | 6/1989 | Matsushita et al. |
| 4,922,604 A | 5/1990 | Marshall et al. |
| 4,983,866 A | 1/1991 | LOk |
| 5,095,612 A | 3/1992 | McAvena |
| 5,268,607 A | 12/1993 | McManus |
| 5,313,698 A | 5/1994 | Schaeftlmeier et al. |
| 5,334,897 A | 8/1994 | Ineson et al. |
| 5,442,248 A * | 8/1995 | Agnoff ......................... 310/71 |
| 5,490,319 A * | 2/1996 | Nakamura et al. ............ 29/596 |
| 6,608,414 B1 * | 8/2003 | Conley ......................... 310/71 |
| 6,867,518 B1 * | 3/2005 | Kurosawa ..................... 310/89 |
| 2002/0117919 A1 * | 8/2002 | Williams et al. .............. 310/89 |
| 2005/0062233 A1 * | 3/2005 | Iketani ....................... 277/549 |
| 2005/0074548 A1 * | 4/2005 | Puterbaugh et al. ........ 427/104 |

FOREIGN PATENT DOCUMENTS

EP     1 363 069 A2     11/2003

* cited by examiner

ELECTRIC MOTORS FOR WASHDOWN, FOOD PROCESSING, AND CHEMICAL APPLICATIONS

FIELD OF THE INVENTION

The present invention relates generally to electric motors, in particular motors used in applications where they are exposed to high levels of moisture, steam, or chemical solutions. More particularly, the present invention describes an electric motor having features for preventing the ingress of moisture into the motor interior, as well as features for insulating critical motor components from oxidative attack.

BACKGROUND OF THE INVENTION

Commercial food processing facilities and the food products moving through such facilities must be maintained in a scrupulously clean condition. One method of achieving this high level of cleanliness is by means of high-pressure, hose-down cleaning with steam, hot water and/or chemical solutions. During the course of the cleaning operation, electric motors utilized in the manufacturing process are exposed to harsh, oxidative conditions. These "washdown motors" as they are referred to in the trade are also used in chemical manufacturing facilities and the like.

In the course of the cleaning process, the level of humidity in the facility being cleaned increases and corrosive chemicals can become dissolved in the wastewater. Steps can be taken to limit direct contact between the wastewater and the motor itself by locating the motor on a pedestal or other raised area. Nonetheless, the resultant high humidity, particularly in combination with dissolved chemicals in the atmosphere, produces a highly corrosive environment. While precautions can be taken to lessen the ingress of moisture into the motor interior by employing multiple seals and water-tight fittings, some amount of corrosive solution will inevitably enter into the motor interior—around the shaft or through inlets for electrical wiring, resulting in chemical attack on the winding or bearings.

One other factor that complicates the design of a corrosion-proof motor is heat. Although copper is a very good conductor of electricity, it is subject to $I^2R$ losses in the form of heat. In order for an electric motor to operate effectively, this heat build-up must be dissipated, typically through the motor's outer shell or casing.

This combination of steam, heat, moisture and other corrosive factors typically results in very short life cycles for washdown motors. It is not uncommon for such motors to fail within a matter of a few months; in some applications failure occurs in a matter of days or weeks. Motor failure is generally due to chemical attack on the copper winding or bearings of the electric motor—in particular, the fixed (or stator) motor windings. This need to constantly replace washdown motors is an added expense to food processors and other users of such motors. Additionally, the need to suspend operations while repairs are made is disruptive to the flow of product through the processing facility and results in increased labor costs.

Thus, there is the need for an electric motor which can be used in washdown applications and which exhibits increased resistance to oxidative attack.

BRIEF SUMMARY OF THE INVENTION

The present invention discloses a corrosion-resistant electric motor, which can be employed in applications involving high humidity or other corrosive situations. The motor is particularly useful in any application that may subject the motor to high pressure spray of water, cleaning agents, and other chemicals.

The motor includes features for preventing moisture from entering into the motor casing and additional protection to those motor components which are prone to oxidative attack—in particular, the motor's stator assembly, which includes copper wire windings disposed around a laminated core, and the motor's bearings, which include components that provide protection for the internal components of the motor from moisture and chemicals.

The structural components of the motor of the present invention include the basic elements of conventional electric motors: 1) a generally cylindrical motor casing or shell; 2) a stator assembly fixedly mounted within the motor casing; 3) a rotor shaft assembly comprising a rotor mounted to a shaft, said shaft disposed along the central axis,of the motor, with at least one end of the shaft extending outside of the motor casing for coupling to an exterior device (e.g. a pump); 3) bearing assemblies along the motor shaft for accommodating rotation of the shaft; 4) end bells at each end of the cylindrical motor assembly; and, 5) an electrical inlet in the motor casing for supplying power to the motor. In addition to these components, the motor contains: additional sealing around the motor shaft ends; a slinger adapted to repel liquid away from the motor shaft, a one way check seal to bleed off the pressure developed from the rapid heat up due to the lip seal friction on the shaft, while sealing during the cleaning and motor cool down mode; an Expanded Polytetraflouroethylene breather plug which only allows vapor to pass through to prevent the motor from pulling a hard vacuum and ingressing contaminates; and, a heat-conductive solid resin encapsulating the winding elements of the motor's stator assembly.

The motor casing employed in the present invention is preferably manufactured from a corrosion-resistant material such as stainless steel. The open ends of the motor casing are flared (i.e., have a somewhat larger diameter when compared to the main body of the motor casing) to facilitate insertion of end bells into the motor casing and to prevent moisture build-up by facilitating drainage. The flared ends also create a place for the internal condensation to gather away from the windings and bearings. The flared ends of the motor casing may also contain drainage holes for removal of liquid away from the motor.

The stator assembly of an electric motor is typically a generally cylindrical structure having an outside diameter slightly larger than that of the motor casing main body, thus allowing the stator assembly to tightly fit within the motor casing. Such cylindrical stator assemblies have open internal regions or bores with internal diameters large enough to accommodate the motor's rotor and shaft. These stator assemblies include a core, which is composed of a plurality of substantially identical circular laminations, each of which has a plurality of inwardly-extending teeth. To form the core, the circular laminations are aligned and arranged in a stack. The teeth of the laminations form a plurality of aligned slots for receiving coils of wire.

A plurality of coils formed from insulated conductive wire (normally copper wire) are inserted into selected core slots with portions of the coils at the ends of the core forming end turn regions. The coils are interconnected to form coil groups or poles. Although the conductive (magnet) wires which form the coils (generally referred to as stator windings) have a thin, insulating coating, this thin coating can easily fail when exposed to high humidity and chemicals, resulting in electrical short circuits and burn out of the motor.

The motor of the present invention incorporates an integral, void-free solid resin coating, which surrounds and encompasses the stator windings and thermally connects the windings to the motor casing. This potting resin serves three functions: a protective layer that isolates the stator windings from contact with moisture which may enter into the motor interior; a means of filling as much of the voids as possible to reduce the amount of vacuum when the motor cools; and, a heat-transfer medium for conducting heat which is generated in the stator windings while the motor is running to the motor casing for discharge into the atmosphere. The potting resin incorporates a heat transfer agent—generally a powdered ceramic such as alumina. A process for the in situ formation of such a potting resin around a motor stator assembly is disclosed in U.S. patent application Ser. No. 10/678,928, filed 3 Oct. 2003, filed contemporaneously herewith, the contents of which is incorporated by reference herein.

The disclosed motor includes a rotatable motor shaft having a fixedly-mounted rotor assembly, which extends along the central axis of the motor. At least one end of the motor shaft (the operative end) extends outside of the motor casing for coupling to a pump or other device.

A pair of circular end bells are disposed at each end of the motor. Each of the end bells is shaped to correspond with the flared ends of the motor casing. Each of the end bells contain a drip groove on the outer diameter of the bearing hub to route condensation to the bottom of the end bell instead of onto the bearing. Each of the end bells contains a centrally-located mounting for bearing assemblies, which both support the motor shaft and allow it to rotate. In addition, at least one of the end bells ("the open end bell") has a shaft bore for passage of the operative end of the motor shaft through one of the bearing assemblies and outside of the motor casing. This region of the motor is prone to moisture intrusion.

In order to counter this seepage, the motor of the present invention incorporates seals and washers in the region where the motor shaft passes, through the open end bell. The bearing assembly mounted in the open end bell has an outer face, which is protected by a one-way check seal, and a shaft lip seal disposed toward the motor exterior, and an inner face, which is disposed toward the motor interior. There is also a very small diametrical clearance between the shaft outer diameter and the end bell inner diameter to keep any foreign objects out. There are also four inter cavity drains which keep moisture from building up around the center hub and onto the seals regardless of mounting position. Finally, a stainless steel slinger is press fit onto the shaft to keep any high pressure spray or liquid material away from the check seal and the shaft lip seal.

Other features and advantages will become apparent to those in the motor manufacturing field from the following description of a preferred embodiment of the present invention in combination with the accompanying drawings.

DETAILED DESCRIPTION

Figure 1:
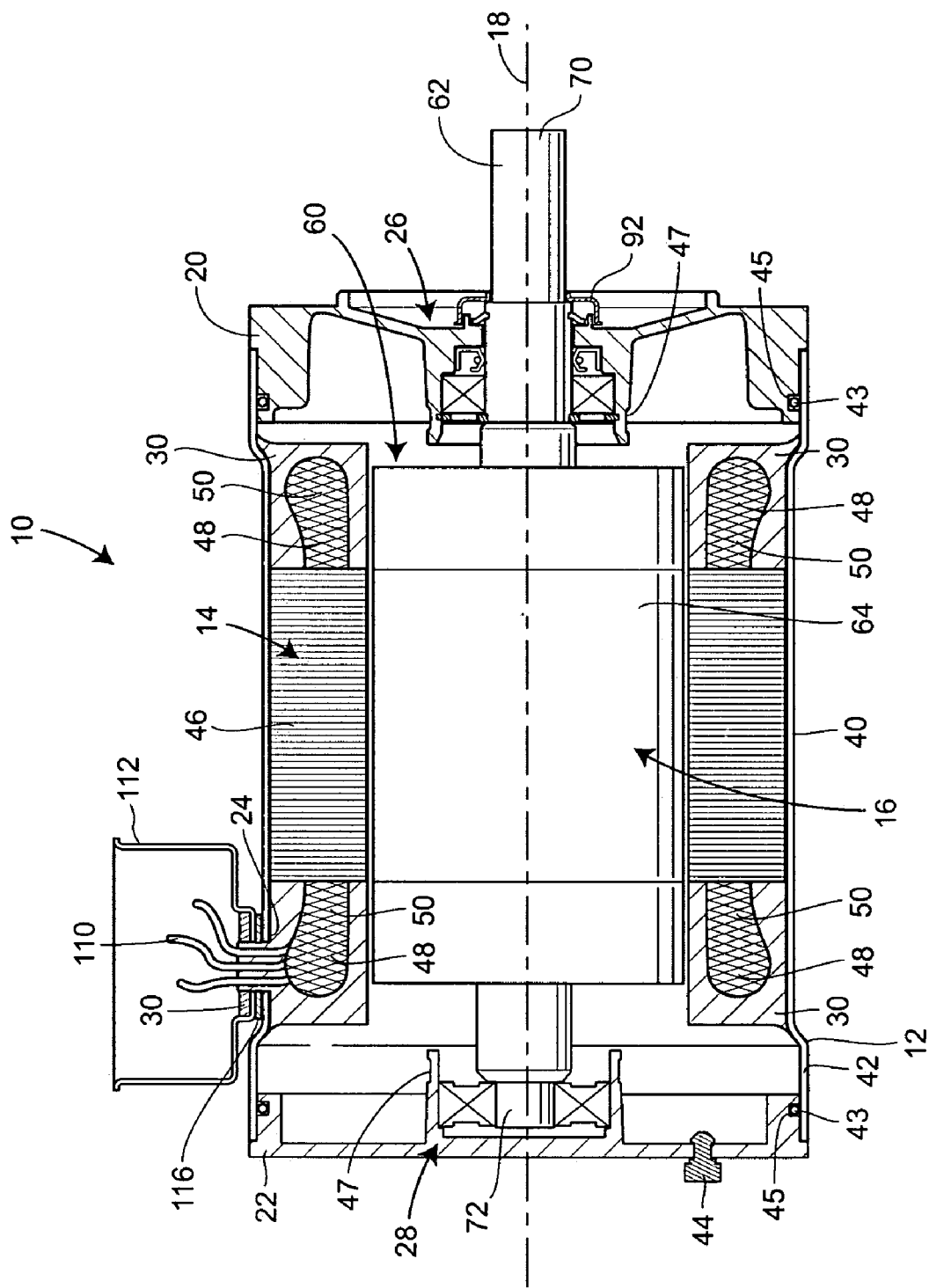
FIG. 1 is a side cut-away view of a motor constructed in accordance with the teachings of the present disclosure.

Referring to FIG. 1, an electric motor 10 constructed in accordance with the teachings of the present disclosure is generally shown. The electric motor 10 includes the basic elements of conventional electric motors that are well known to those of ordinary skill in the art. These components typically include a generally cylindrical motor casing 12 having a central axis 18, a stator assembly 14, a rotor shaft assembly 16 disposed on the central axis 18, first and second end bells 20 and 22, respectively, attached to each end of the motor casing 12, and an electrical inlet 24 in the motor casing 12 for supplying power to the motor 10. The motor 10 further includes a first bearing assembly 26 housed in the first end bell 20 and a second bearing assembly 28 housed in the second end bell 22. Both bearing assemblies 26 and 28 support the rotor shaft assembly 16 when rotating about the central axis 18. The motor 10 also includes a heat-conductive solid resin 30 that substantially covers the stator assembly 14.

Figure 2:
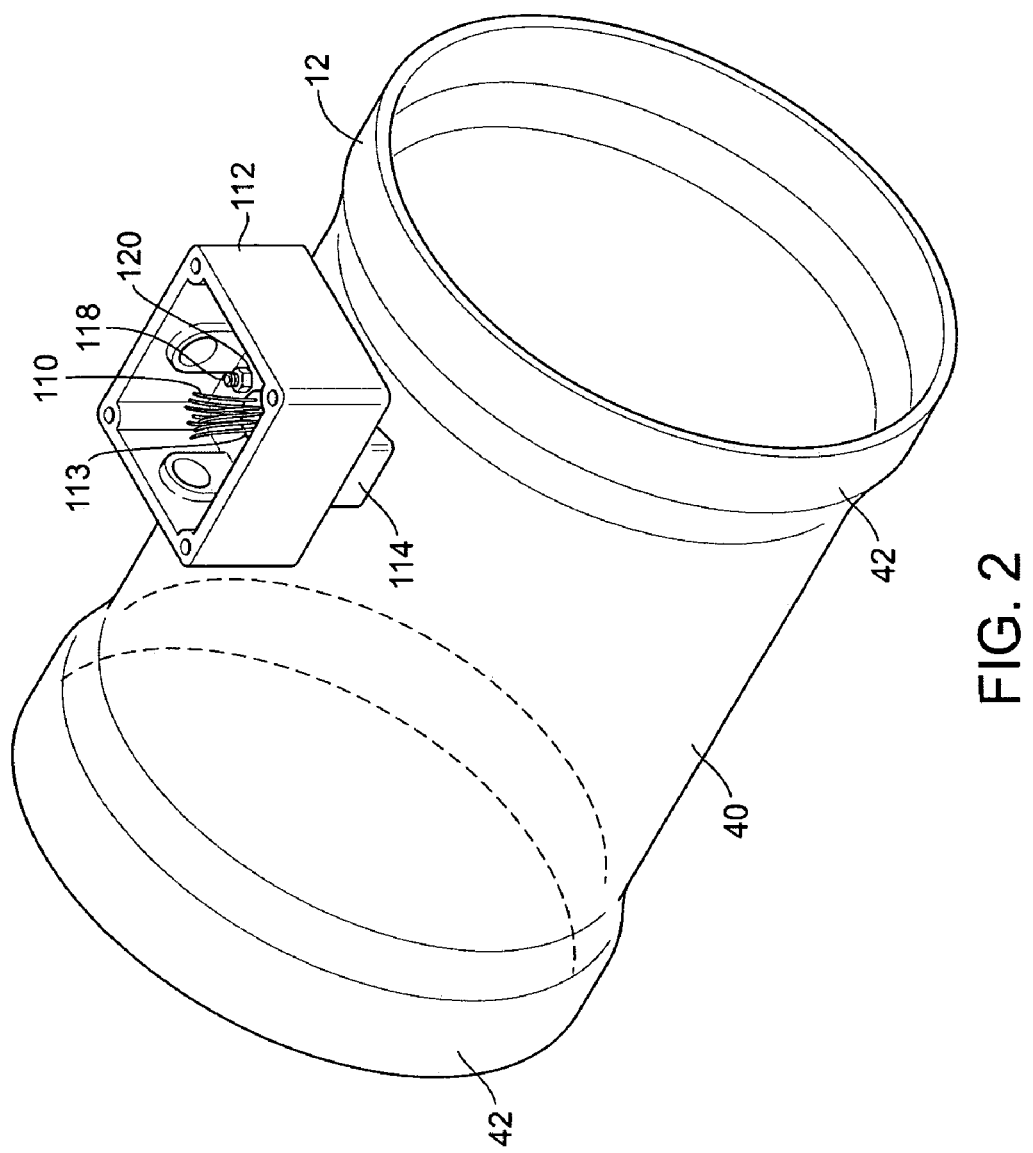
FIG. 2 is an isometric view of a motor casing and a conduit box of a motor constructed in accordance with the teachings of the present disclosure.
Figure 3:
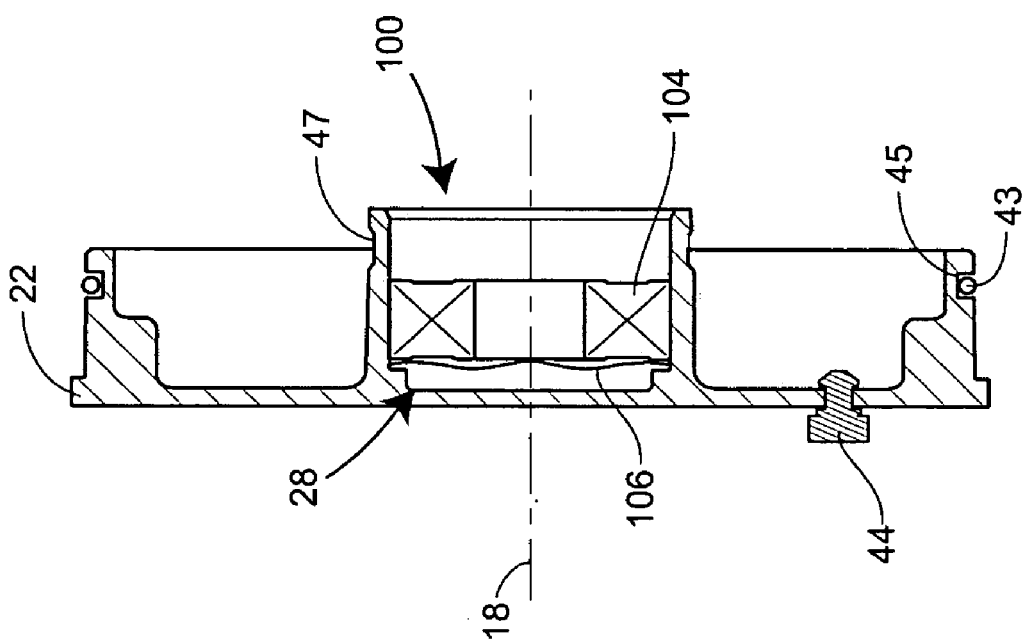
FIG. 3 is a side cut-away view of a second end bell for a motor constructed in accordance with the teachings of the present disclosure.
Figure 5:
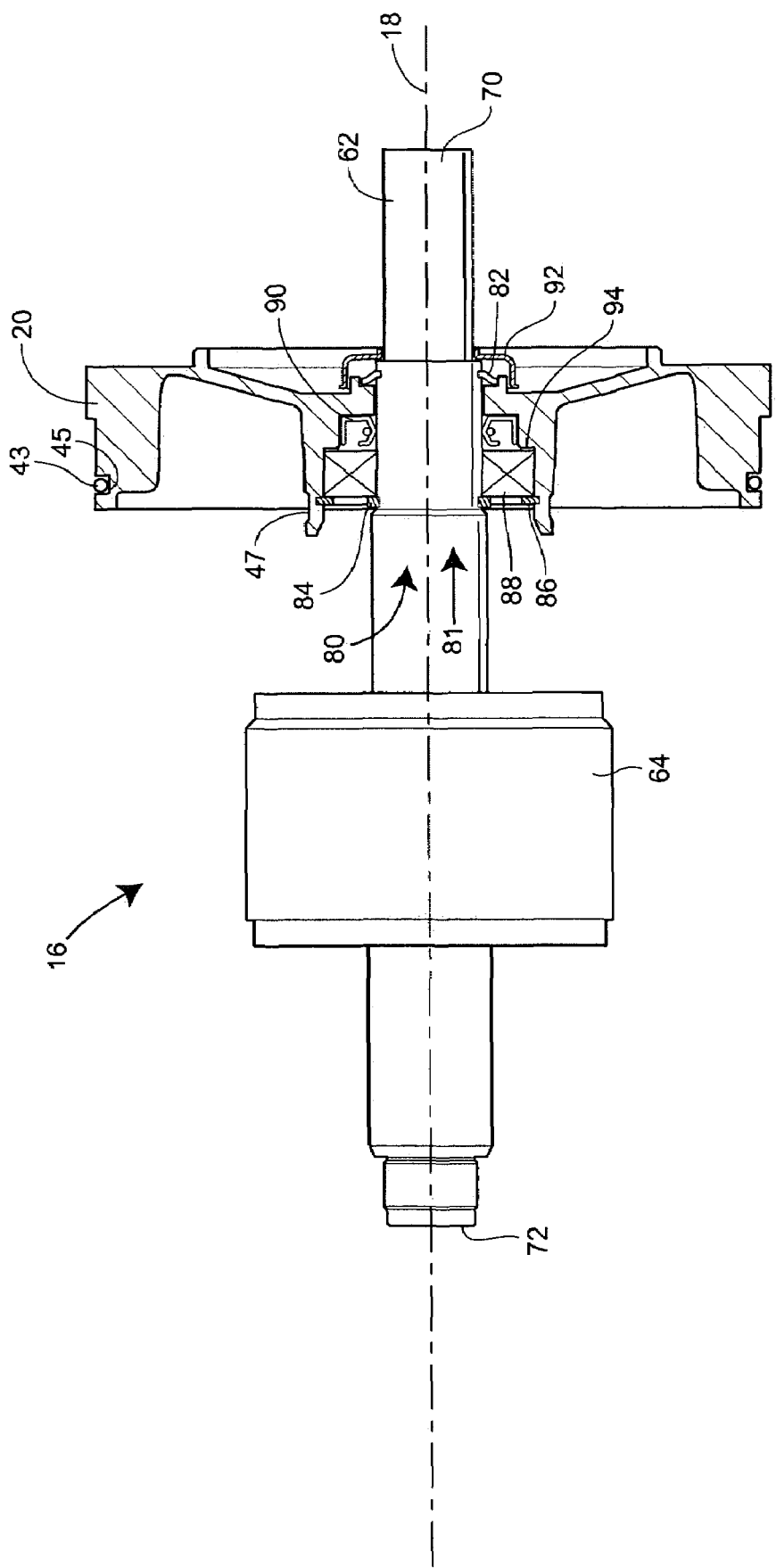
FIG. 5 is a side elevational view of a rotor assembly for a motor constructed in accordance with the teachings of the present disclosure, shown assembled with the first end bell of FIG. 4.

Referring to FIG. 2, the motor casing 12 includes a casing main body 40 and ends 42 that are flared or belled (i.e., have a somewhat larger diameter when compared to the main body of the motor casing 12). The motor 10 is sealed using an o-ring 43 housed in a circumferential groove 45 of each end bell 20 and 22 (shown in FIGS. 1, 3, 4, 5 and 7). However, as will become apparent in the following, wide temperature fluctuations of the motor 10 require it to be breathable. Accordingly, the motor 10 includes at least one breather plug 44 that is disposed in one of the end bells 20 and 22. The breather plug 44 provides airflow between the interior of the motor and the exterior thereof without allowing moisture to seep into the motor casing 12. The breather plug 44 is constructed from Expanded Polytetraflouroethylene that has been processed to make it oleophobic. One of ordinary skill in the art will readily appreciate that the breather plug 44 can be constructed from other similar materials, such as Goretex®. In the disclosed example, as shown in FIGS. 2 and 3, only the end bell 22 (i.e., the rear end bell) includes a breather plug 44. The end bells 20 and 22 also include a drip grooves 47 to route condensation to the bottom of the end bells 20 and 22 instead of onto the bearing assemblies 26 and 28.

Alternately, the motor 10 may not be sealed, and each of the flared ends 42 can include drain holes (note shown) for draining any moisture that may accumulate inside the motor casing 12 to the outside thereof. Accordingly, regardless of the orientation of the motor 12, any moisture that may accumulate in the casing main body 40 will flow to one or both of the flared ends 42. Even when the motor casing 12 is horizontally oriented, moisture flows to one or both of the flared ends 42, since the flared ends 42 have a relatively lower internal surface than the casing main body 40. From the flared ends 42, the moisture drains to the outside of the casing 12 through the drain holes (not shown).

The flared ends 42 also correspond in shape to the shape of the end bells 20 and 22 and are sized (long press fit to prevent ingress) to receive the end bells 20 and 22 for sealed closure of the motor casing 12. The motor casing 12 of the present disclosure is preferably manufactured from a corrosion resistant material, such as stainless steel. One of ordinary skill in the art will readily recognize, however, that the motor casing 12 can be constructed from any corrosion resistant material that can support the various components of the motor 10 and efficiently dissipate the heat generated by the motor 10.

Referring to FIG. 1, the stator assembly 14 is a generally cylindrical structure with an outside diameter that is slightly larger than the inside diameter of the main casing body 40. Accordingly, the stator assembly 14 can be press fit inside the main casing body 40 for fixed attachment to the casing body 40. Additionally, the press fitting of the stator assembly 14 inside the casing main body 40 provides good heat transfer between the stator assembly 14 and the casing main body 40. The stator assembly 14 is constructed similar to stator assemblies of typical electric motors that are well known to those of ordinary skill in the art. Accordingly, the stator assembly 14 includes a core 46 and wire windings 48. The core 46 is typically composed of a plurality of substantially identical circular laminations (not shown), each of which has a plurality of inwardly-extending teeth (not shown). To form the core 46, the circular laminations are aligned and arranged in a stack. The teeth of the laminations form a plurality of aligned slots (not shown) for receiving coils of wire that form the wire windings 48 of the stator assembly 14. The wire windings 48 include loops or end-turn regions 50 when exiting a slot and entering an adjacent slot.

To protect the wire windings 48 and the end-turn regions 50 from moisture, humidity, and any corrosive material that may enter the motor casing 12, the wire windings 48 are encapsulated in the solid resin 30. As shown in FIG. 1, the solid resin 30 encapsulates the end-turns 50, the portions of the wire windings 48 that are in the slots (not shown), and any gap that may be present between the core 46 and the inner wall of the motor casing 12. In effect, the resin 30 covers the entire or a substantial portion of the stator assembly 14. The resin 30 is formed so as to be free of voids and virtually integral with the stator assembly 14. The resin 30 is also heat conductive. Accordingly, the resin 30 serves two functions: a protective layer that isolates the windings 48 from contact with moisture that may enter the motor casing 12; and, a heat-transfer medium for conducting heat that is generated in the windings 48 when the motor 10 is running to the motor casing 12 for discharge into the atmosphere. The resin 30 occupies a substantial volume of the casing 12, because it is desirable to have the resin 30 occupy as much of the casing 12 as possible without hindering the operation of the motor 10. Accordingly, any gaps inside the casing between various components of the motor 10 will be small. For example, the gap between each end bell 20 and 22 and the resin 30 can be ⅛". A process for the in situ formation of such a resin 30 around the stator assembly 14 is disclosed in U.S. patent application Ser. No. 10/678,928, filed 3 Oct. 2003, filed contemporaneously herewith, the contentsof which is incorporated by reference herein.

The generally cylindrical shape of the stator assembly 14 provides a central bore 60 therein for receiving the rotor assembly 16. The rotor 16 includes a motor shaft 62 that is disposed along the central axis 18 of the motor 10. The motor shaft 62 is concentrically surrounded by and affixed to a generally cylindrical rotor core 64, which has a slightly smaller diameter than the internal diameter of the central bore 60. The rotor core 64 is positioned in the central bore 60 so as to rotate therein without coming into contact with the internal wall of the central bore 60. As discussed below, the positions of the rotor core 64 in the central bore 60 is supported and maintained by the first and second bearing assemblies 26 and 28, respectively. The rotor core 64 is protected from any moisture or corrosive material that may enter the motor casing 12 by being coated with epoxy.

Figure 7:
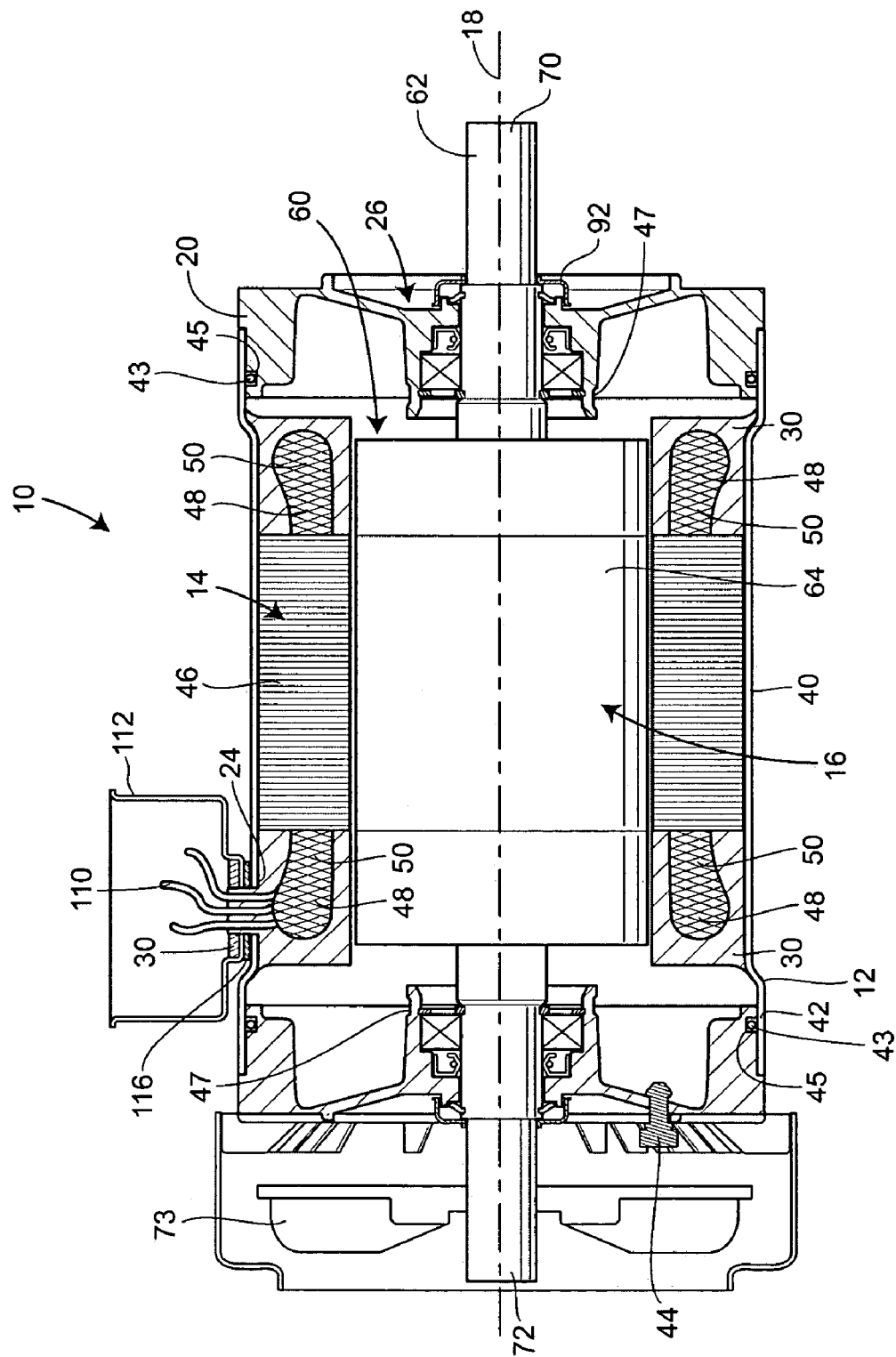
FIG. 7 is a side cut-away view of a motor constructed in accordance with the teachings of the present disclosure.

In the disclosed example shown in FIGS. 1–3, an operative end 70 of the shaft 62 extends outside the motor casing 12, while a non-operative end 72 of the shaft 62 is enclosed in the motor casing 12. One of ordinary skill in the art will readily appreciate, however, that both ends of the motor shaft 62 may extend outside the motor casing 12, as shown in FIG. 7. The operative end 70 of the shaft 62 operationally couples to a device that the motor operates, and the non-operative end 72 of the shaft 62 can operationally couple to a fan 73 that blows air toward the motor casing 12 to cool the casing 12 during the operation of the motor 10. Alternately, in some electric motors, the non-operative end 72 of the shaft 62 may actually be operative by extending outside the motor casing 12 to operationally couple to another device that the motor 10 operates.

The first end bell 20 and the second end bell 22 are a long press fit with o-rings 43 positioned deep inside the casing to eliminate ingress and hi pressure from coming in contact with the o-rings 43 inside the flared-ends 42. The end bells 20 and 22 can be attached and secured to the motor casing 12 by methods that are well known to those of ordinary skill in the art. In the disclosed example, holes (not shown) extending through the casing parallel to central axis 18 are formed in the resin to receive through bolts (not shown) for securely attaching the end bells 20 and 22 to the motor casing 12. There is also an o-ring (not shown) under the head of each through bolt (not shown).

Figure 4:
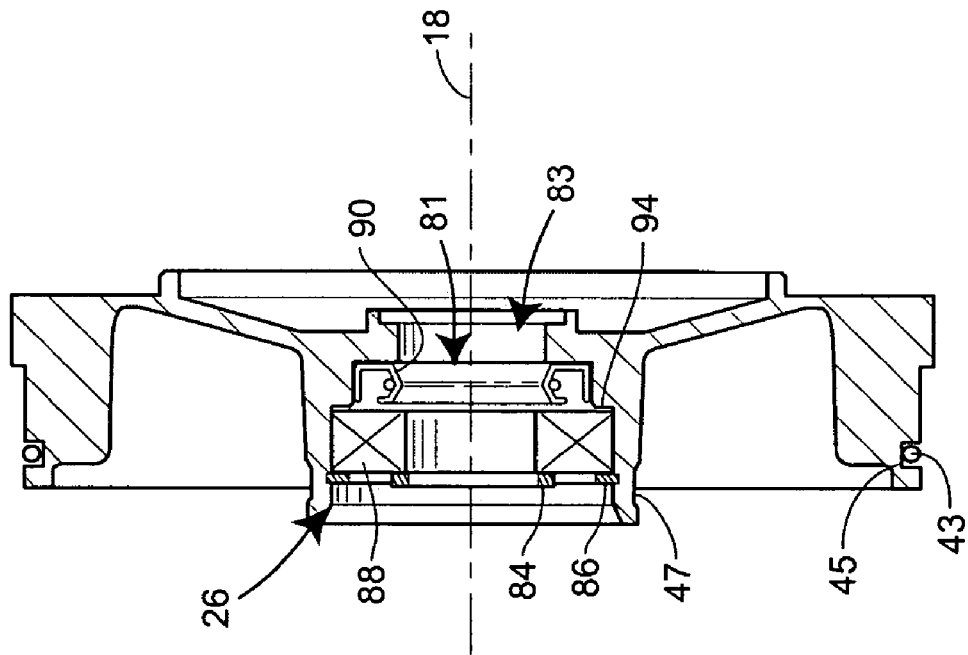
FIG. 4 is a side cut-away view of a first end bell for a motor constructed in accordance with the teachings of the present disclosure.

Referring to FIG. 4, the first end bell 20 includes a centrally disposed shaft bore 80 (i.e., the open end bell) that houses the first bearing assembly 26. The axis of the shaft bore 80 coincides with the central axis 18 of the motor 10 so as to keep the axis of the rotor shaft assembly 16 aligned with the central axis 18. The first bearing assembly 26 seals the shaft bore 80 from moisture that may be present outside the motor casing 12. The first bearing assembly 26 concentrically surrounds the shaft 62 and includes an inner face 81, which faces the interior of the casing 12, and an outer face 83, which faces the exterior of the casing 12. The first bearing assembly 26 includes, in the following order from the inner face 81 to the outer face 83, a shaft washer 84, a retainer ring 86, a sealed ball bearing 88, a shaft lip seal 90, a one-way check seal 82, and a slinger 92 (shown in FIGS. 1 and 5). There is also a very small diametrical clearance (not shown) between the shaft outer diameter and the end bell inner diameter to keep any foreign objects from entering the motor.

The lip seal 90 surrounds the shaft 62 to prevent moisture or liquid material from seeping into the motor casing 12 from the shaft bore 80. The ball bearing 88 rotationally supports the shaft 62 in the shaft bore 80 and maintains the rotor shaft assembly 16 aligned with the central axis 18. Additionally, the ball bearing 88 is sealed, and preferably, double sealed. Such double sealed ball bearings are well known to those of ordinary skill in the art. The position of the ball bearing 88 in the shaft bore 80 is fixed by being disposed between the retainer ring 86 and a lip 94 in the shaft bore 80. In effect, the retainer ring 86 and the lip 94 create an annular groove in the shaft bore 80 for securely housing the ball bearing 88. The shaft washer 84 is disposed between the bearing 88 and an internal shaft shoulder. The one way check seal 82 is disposed along the shaft 62 between the lip seal 90 and the slinger 92. The check seal 82 provides for outward bleeding of pressure that develops between lip seal 90 and the check seal 82 during the operation of the motor 10. The friction between the shaft 62 and the lip seal 90 quickly generates heat during motor operation. Accordingly, any moisture that is disposed along the shaft 62 between the lip seal 90 and the check seal 82 will create excessive pressure. The one way check seal 82 relieves this pressure by allowing the pressure to bleed outward. Additionally, when the motor 10 cools, it draws a vacuum. The one way check seal 82 seals when the motor 10 is shut off and cool down starts. When the motor 10 is subject to spray the recessed counter bore allows the liquid to run off the backside of the one way check seal 82 instead of going into the shaft bore. However, the breather plug 44 allows the motor 10 to breathe, while preventing the motor 10 from drawing moisture inside the motor casing 20.

The slinger 92 covers the one way check seal 82 and rotates with the shaft 62 during the operation of the motor to repel any liquid material approaching the shaft bore 80 from outside the casing 12 whether the motor 10 is running or at rest. The clearance at the outside diameter between the slinger 92 and the endbells 20 and 22 is kept very small to limit the amount of spray, that could come in contact with the one way check seal 82. Since the space between the one way check seal 82 and the slinger 92 is larger than the clearance between the endbells 20 and 22 and the slinger 92, the pressure drops, which reduces the pressure on the one way check seal 82. The slinger 92 is preferably constructed from a corrosion resistant material such as stainless steel.

Referring to FIG. 3, the second end bell 22 includes a cylindrical slot 100 for housing the second bearing assembly 28, which rotationally supports and maintains the shaft 62 in alignment with the central axis 18. The second bearing assembly 28 concentrically surrounds the shaft 62, and includes a ball bearing 104 and a wavy spring 106. The shaft 62 is rotationally supported in the slot 100 by the ball bearing 104, which is sealed, and preferably double sealed. Such double sealed ball bearings are well known to those of ordinary skill in the art. The non-operative end 72 of the shaft 62 and the ball bearing 104 press against the wavy spring 106, which resiliently maintains the position of the ball bearing 104 in the slot 100 and relative to the shaft 62.

As described in the foregoing, a particular application for an electric motor may dictate that both ends of the shaft 62 extend outside the motor casing 12. In such a scenario, the second end bell 22 may be identical to the first end bell 20 so that the shaft 62 can also extend outside the casing 12 through the second end bell 22. Additionally, the second end bell 22 may house a bearing assembly identical to the first bearing assembly 26 to prevent moisture from seeping into the motor casing 12 through the shaft bore 80 as described in the foregoing in relation to the first bearing assembly 26. Additionally, as described in the foregoing, one or both end bells can include one or more breather plugs 44. The motor 10 can be alternately constructed without the resin 30, i.e., the stator windings being exposed. Although such a construction will not provide the degree of protection provided by the resin 30, the o-rings 43 of the end bells 20 and 22, and the bearing assemblies 26 and 28 provide significant sealing of the interior of the motor casing 10.

Figure 6:
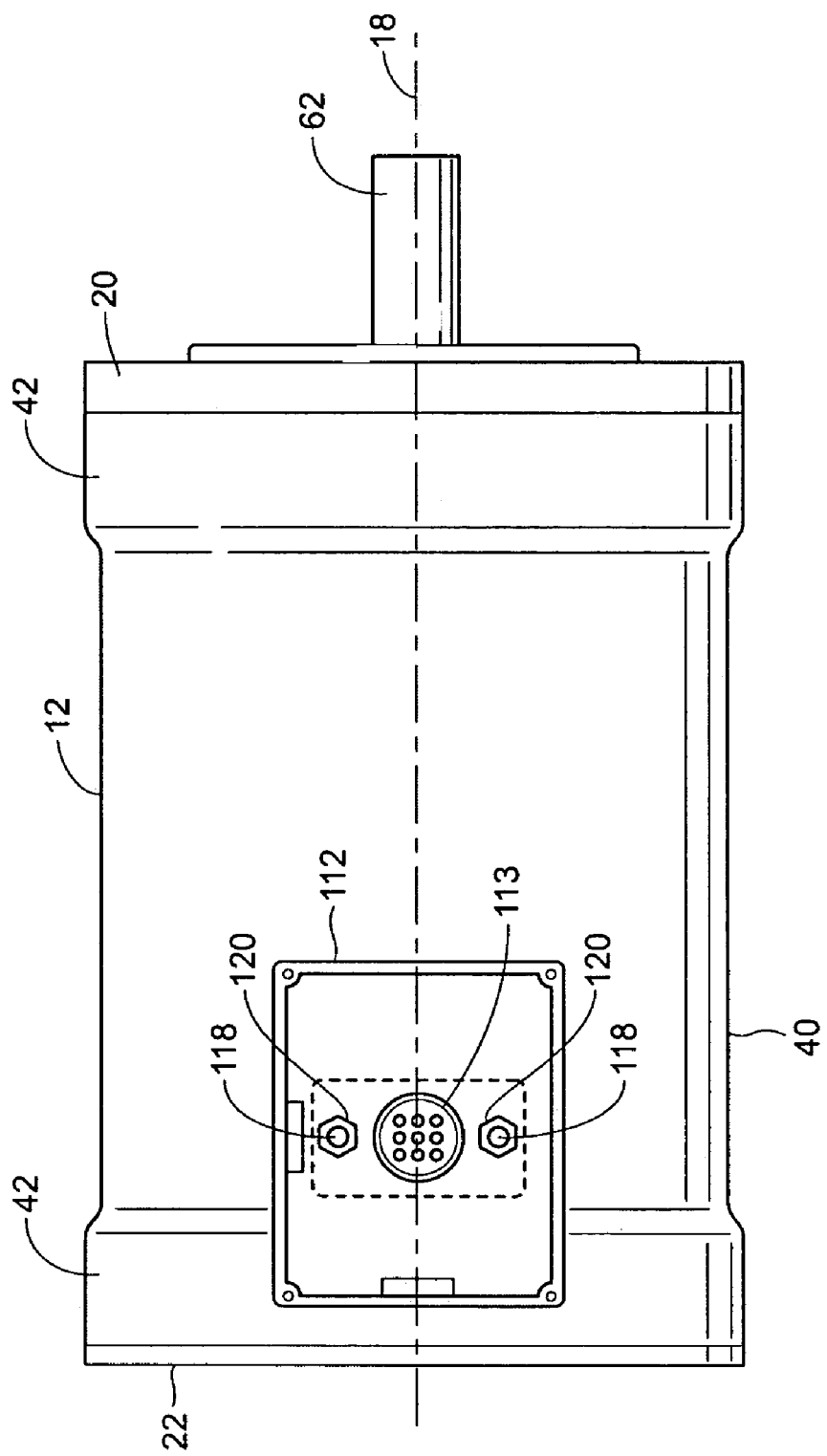
FIG. 6 is a top elevational view of a motor constructed in accordance with the teachings of the present disclosure.

Referring to FIGS. 1, 2 and 6, electrical wires 110 are connected to the stator assembly 14 to provide power thereto. The electrical wires 110 are accessible from outside the motor casing 12 through the electrical inlet 24. A conduit box 112 that includes a conduit inlet 113 is mounted to the motor casing 12 such that the conduit inlet 113 and the electrical inlet 24 are substantially aligned. Accordingly, the electrical wires 110 can be passed into the conduit box 112 through the electrical inlet 24 and the conduit inlet 113. As shown in FIG. 2, the conduit box 112 is rectangular in the disclosed example, while the outer surface of the motor casing 12 is circular. Accordingly, attaching the conduit box 112 to the motor casing 12 creates a space between the two, through which moisture may seep into the motor casing 12. To seal this connection, the bottom of the conduit box 112 includes a transition box 114 that is arc shaped in accordance with the shape of the motor casing 12 to connect to the casing 12 without any large gaps or spaces. Additionally, the connection between the transition box 114 and the motor casing 12 may be sealed by a gasket 116 (shown in FIG. 1). The conduit box 112 includes two or more holes (not shown) on the bottom thereof that correspond with two holes (not shown) in the motor casing 12 for receiving correspondingly sized bolts 118 and nuts 120 (shown in FIG. 6) to secure the conduit box 112 to the motor casing 12. As shown in FIG. 6, the holes are preferably disposed on opposite sides of the conduit inlet 113 and positioned so that the bolts 118 pass through the transition box 114.

To prevent moisture from seeping into the motor casing 12 from the electrical inlet 24, the resin 30 extends from the interior of the motor casing 12 to inside the conduit box 112 through the electrical inlet 24 and the transition box 114. Accordingly, as shown in FIG. 1, the resin 30 fills the electrical inlet 24 and the transition box 114 to encapsulate the electrical wires 110 and the bolts 118. Additionally, the resin 30 encapsulates the lower portions of the leads of the electrical wires 110 that enter the conduit box 112 to prevent moisture from seeping into the motor casing 12 through the electrical wires 110.

A submersible heat shrink tube (not shown) having an epoxy lining also surrounds ends of the electrical wires 110 and the leads or conductors (not shown) of the electrical wires 110. After the leads or the conductors (not shown) are connected to external wiring or connections as desired, the shrink tube can be heated to shrink around the conductors or the leads. Additionally, the epoxy of the shrink tube seals the connections of the conductors or the leads. Accordingly, moisture cannot enter the motor casing 12 through the conduit box 112 even in submersible applications. The conduit box 112 also includes a lid (not shown) and one or more gaskets (not shown) that may be disposed between the lid and the conduit box 112 to seal the interior thereof. Additionally, the gasket may include-cutouts that act as drains for all mounting positions and configurations of the conduit box 112.

The disclosed motor 10 is a corrosion-resistant electric motor, which can be employed in applications involving high humidity or other corrosive situations. The motor can also be used in washdown applications (i.e., to power the process equipment in chemical and food manufacturing facilities, which is regularly cleaned with high-pressure spray and strong cleaning solutions), or in applications where the motor is exposed to high pressure spray. The bearing assemblies 26 and 28 prevent moisture from entering into the motor casing 12, while the breather plugs 44 allow the motor 10 to breathe, while preventing moisture from entering the motor casing 12, and the resin 30 and the epoxy coating the rotor core 64 provide additional protection should moisture, and in particular, highly corrosive material enter the casing 12.

Persons of ordinary skill in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the teachings of the invention.

We claim:

1. An electric motor comprising:
    a motor casing having opposed open ends, the motor casing having an inner casing surface;
    a stator assembly disposed in the interior of the motor casing, the stator assembly having a core defining an internal bore and an outer core surface, the inner casing surface and the outer core surface defining an interface therebetween;
    a rotor shaft assembly disposed in the internal bore of the stator assembly and including a shaft;
    first and second casing closures sized and adapted to close the open ends of the motor casing, each of the casing closures including a bearing assembly adapted to support the shaft and substantially seal the interior of the motor casing;
    a cured, thermally-conductive coating material which substantially covers the stator assembly, physically contacts the interior of the motor casing, and substantially fills any gap at the interface between the inner casing surface and the outer core surface, thereby thermally connecting the stator assembly to the motor casing;
    wherein at least one of the bearing assemblies includes a bearing, a shaft lip seal, a one way check seal and a slinger disposed on an outer face of the bearing assembly, the slinger substantially covering the check seal; and
    wherein the motor casing and the casing closures define a motor housing and the motor housing includes a breather plug constructed from a breathable membrane.

2. An electric motor according to claim 1, further comprising:
    an electrical inlet disposed on the motor casing;
    a conduit box having a conduit inlet, the conduit box mounted to an exterior of the casing such that the conduit inlet is substantially aligned with the electrical inlet;
    a plurality of electrical wires adapted to provide power to the stator assembly, the electrical wires passing from the interior of the motor casing into the conduit box through the electrical inlet and the conduit inlet;
    wherein the coating material extends from the interior of the casing through the electrical inlet and the conduit inlet to encapsulate the electrical wires and cover a bottom portion of the electrical wires extending into the conduit box.

3. An electric motor according to claim 2 further including:
    a transition box having an arc-shaped face for contacting the motor casing disposed between the motor casing and the conduit box.

4. An electric motor according to claim 2, further comprising a heat shrink tube having an adhesive lining adapted to seal the connection at the ends of the electrical wires.

5. An electric motor according to claim 1, wherein the coating material is impervious to moisture and is formed from a curable liquid resin including a powdered ceramic material.

6. An electric motor according to claim 1, wherein the bearing comprises a ball bearing.

7. An electric motor according to claim 1, wherein the motor casing is manufactured from stainless steel.

8. An electric motor according to claim 1, wherein the breathable membrane is constructed from expanded polytetraflouroethylene.

9. An electric motor according to claim 1, wherein an operative end of the shaft extends outside the motor casing through the first casing closure, and wherein the non-operative end of the shaft is enclosed in the motor casing by being disposed in a correspondingly sized slot in a second casing closure.

10. The motor of claim 1 wherein the breather plug is disposed in one of the casing closures.

11. An electric motor comprising:
    a stator assembly including a generally cylindrical core defining a stator bore and wire windings housed in the core and extending outward from ends of the core, the core having an outer core surface;
    a rotor shaft assembly disposed in the stator bore of the stator assembly and including a generally cylindrical rotor affixed to a shaft extending along the central axis, the shaft including a first, operative end extending outward from the casing and a second end;
    a generally open-ended motor casing adapted to house the stator assembly and the rotor shaft assembly in the interior thereof, the casing having an inner casing surface, the inner casing surface and the outer core surface defining an interface therebetween;
    a first end bell and a second end bell adapted to close the opposed open ends of the motor casing and substantially seal the interior of the motor casing from the exterior thereof, the first end bell and the second end bell including bearing assemblies for rotationally supporting the rotor shaft assembly, wherein at least one of the bearing assemblies includes a bearing, a shaft lip seal, a one way check seal and a slinger disposed on an outer face of the bearing assembly, the slinger substantially covering the check seal;
    a conduit box mounted on the exterior of the casing, the conduit box having electrical access to the interior of the casing through an electrical inlet disposed on the exterior of the casing, wherein a plurality of electrical wires connected to the stator assembly pass from the interior of the casing through the electrical inlet into the conduit box; and
    a thermally-conductive coating material adapted to encapsulate the wire windings of the stator assembly and to substantially fill any gap at the interface between the inner casing surface and the outer core surface;
    wherein the cured coating material physically contacts both the stator assembly and the interior of the motor casing, thereby transferring heat from the motor windings to the motor casing when the motor is running, and a portion of the cured coating material extends from the interior of the motor casing into the conduit box through the electrical inlet to encapsulate the electrical wires and cover a portion of the electrical wires extending into the conduit box; and
    wherein the motor casing and the casing closures define a motor housing and the motor housing includes a breather plug constructed from a breathable membrane.

12. An electric motor according to claim 11, further comprising a heat shrink tube having an adhesive lining adapted to seal the connection at the ends of the electrical wires extending into the conduit box.

13. An electric motor according to claim 11, wherein the coating material is impervious to moisture and is formed from a curable liquid resin including a powdered ceramic material.

14. An electric motor according to claim 11, wherein the bearing comprises a ball bearing.

15. An electric motor according to claim 11, wherein the motor casing is manufactured from stainless steel.

16. An electric motor according to claim 11, wherein the breathable membrane is constructed from expanded polytetraflouroethylene.

17. An electric motor according to claim 11, wherein an operative end of the shaft extends outside the motor casing through the first end bell, and wherein the non-operative end of the shaft is enclosed in the motor casing by being disposed in a correspondingly sized slot in a second end bell.

18. The motor of claim 11 wherein the breather plug is disposed in one of the casing closures.

19. An electric motor comprising:
    a motor casing being generally cylindrical and having open ends, the motor casing including an inner casing surface;
    a stator assembly disposed in an interior of the casing, the stator assembly having a generally cylindrical core defining an internal bore, and an outer core surface, the inner casing surface and the outer core surface defining an interface therebetween;
    a heat conductive resin encapsulating the stator assembly and thermally connecting the stator assembly to the motor casing, and substantially filling any gap at the interface between the inner casing surface and the outer core surface;
    a pair of casing closures sized and adapted to close the open ends of the casing, at least one of the casing closures having a shaft bore;
    a rotor shaft assembly disposed in the internal bore of the stator assembly and including a shaft, at least one end of the shaft extending outside the casing through the shaft bore of at least one of the casing closures;
    a bearing assembly adapted to rotationally support the shaft extending outside the motor casing through the shaft bore; and
    wherein the casing closures and the bearing assembly are adapted to substantially seal the interior of the casing;
    wherein at least one of the bearing assemblies includes a bearing, a shaft lip seal, a one way check seal and a slinger disposed on an outer face of the bearing assembly, the slinger substantially covering the check seal; and
    wherein the motor casing and the casing closures define a motor housing and the motor housing includes a breather plug constructed from a breathable membrane.

20. An electric motor according to claim 19, wherein the coating material is impervious to moisture and is formed from a curable liquid resin including a powdered ceramic material.

21. An electric motor according to claim 19 wherein the bearing comprises a ball bearing.

22. An electric motor according to claim 19, wherein the motor casing is manufactured from stainless steel.

23. An electric motor according to claim 19, wherein the breathable membrane is constructed from expanded polytetraflouroethylene.

24. An electric motor according to claim 19, further comprising:
    an electrical inlet disposed on the motor casing;
    a conduit box having a conduit inlet, the conduit box mounted to an exterior of the motor casing such that the conduit inlet is substantially aligned with the electrical inlet;
    a plurality of electrical wires adapted to provide power to the stator assembly, the electrical wires passing from the interior of the casing into the conduit box through the electrical inlet and the conduit inlet; and
    at least one seal disposed between the conduit box and the casing to substantially seal the electrical inlet of the casing.

25. An electric motor according to claim 24 further including:
    a transition box having an arc-shaped face for contacting the motor casing disposed between the motor casing and conduit box.

26. An electric motor according to claim 19, wherein the bearing comprises:
    a sealed ball bearing and a slinger.

27. The motor of claim 19 wherein the breather plug is disposed in one of the casing closures.

* * * * *